United States Patent

Sondhi

[15] 3,679,020
[45] July 25, 1972

[54] RECONSTRUCTION OF OBJECT SHAPE FROM SOUND DIFFRACTION PATTERN

[72] Inventor: Man M. Sondhi, Berkeley Heights, N.J.
[73] Assignee: Bell Telephone Laboratories Incorporated, Murray Hill, Berkeley Heights, N.J.
[22] Filed: April 2, 1969
[21] Appl. No.: 812,638

[52] U.S. Cl. ..................181/0.5 R, 181/0.5 ED, 340/5 I, 340/15
[51] Int. Cl. ..........................................G01v 1/00
[58] Field of Search......................340/5 I; 181/0.5

[56] References Cited

UNITED STATES PATENTS 3,606,518  9/1971  Metherell ..............................350/3.5

*Primary Examiner*—Samuel Feinberg
*Assistant Examiner*—H. A. Birmiel
*Attorney*—R. J. Guenther and William L. Keefauver

[57] ABSTRACT

The shape of an object is reconstructed from measurements of the diffraction pattern observed in a monochromatic sound wave which irradiates the object. Both the amplitude and phase of sounds at a discrete set of points near the object (a rectangular lattice of suitable dimensions) are measured and used to evaluate the wavefront of the distorted sound wave. From these data, a visual display is constructed, e.g., on a facsimile receiver, cathode ray display, or the like.

4 Claims, 4 Drawing Figures

INVENTOR
M. M. SONDHI
BY
G. E. Hirsch Jr.
ATTORNEY

RECONSTRUCTION OF OBJECT SHAPE FROM SOUND DIFFRACTION PATTERN

FIELD OF THE INVENTION

This invention relates to the method of reconstructing the shape of an object from measurements of the diffraction pattern of the object obtained when the object is placed in the path of a monochromatic sound wave. It is the principal aim of the invention to create a graphic reconstruction of an object by means of an acoustic camera. Such reconstructions are useful for the nondestructive testing of materials and for various forms of image identification.

BACKGROUND OF THE INVENTION

The visualization of objects from their interaction with sound waves have recently acquired great significance in various fields of acoustical physics and engineering. Conventional methods of visualization generally imitate either optical systems, by forming an image with a lens arrangement, or radar systems, which estimate the shape of an object from measurements of the phase and amplitude of short pulses scattered by it. Echo techniques have potential for the detection of objects but do not appear to be well suited for identification. Acoustic lens arrangements appear to be attractive at first sight; however, the construction of suitable acoustic lenses is very difficult. Some success has been reported in utilizing ultrasonic frequencies to photograph objects with a so-called "sound camera." However, it appears that no such sound camera has been constructed for operation at frequencies in the audible range. Recently, some experiments have been reported which apply the techniques of holography to acoustic wavefront reconstruction. Both ultrasonic and audible frequencies have been used with some success. However, images reconstructed by these techniques usually bear scant resemblance to the original objects. Moreover, holographic techniques require the use of elaborate scanning equipment. By using recording equipment insensitive to phase, they also miss an essential attribute of a sound wave, namely, that (unlike a light wave) its phase can be readily measured.

SUMMARY OF THE INVENTION

In accordance with this invention, an alternative approach is taken, namely, the direct measurement of an acoustic wavefront. Whereas holography may be regarded as a technique of reconstructing a complex wavefront using recording media which are insensitive to phase, this invention records an entire complex wavefront created by sound waves in the audio frequency region. In accordance with the invention, the shape of an object is reconstructed from a measurement of the diffraction pattern of the object when placed in the path of a monochromatic sound wave. The amplitude and phase of sounds at a discrete set of points near the object, for example, within a bounded lattice of suitable dimensions, are measured and used to evaluate the wavefront of the distorted sound wave. Measurements of both amplitude and phase in a plane at a distance from the object irradiated with plane sound waves enables a wavefront to be constructed sufficient for developing an image replica of the object. Evaluation is carried out with a selected combination of apparatus elements, preferably including a programmed general purpose computer. Alternatively, the entire evaluation may be carried out by computer operations. From the developed data, a visual display is constructed, for example, by a facsimile receiver, a cathode ray display, or the like.

DESCRIPTION OF THE DRAWINGS

The invention will be fully apprehended from the following detailed description of a preferred illustrative embodiment thereof taken in connection with the appended drawings in which.

DETAILED DESCRIPTION

The method of visualizing an object from the pattern of a sonic wave dispersed by an object in the field of the wave, in accordance with the invention, includes the steps of irradiating an object with a sound wave, measuring the amplitude and phase of the resulting wave at a selected number of discrete points in a plane within the acoustic field surrounding the object, using the measurements so obtained to evaluate the complex radiation pattern of the wave and finally to utilize the evaluation data to control the generation of a visual replica of the object.

Figure 1:
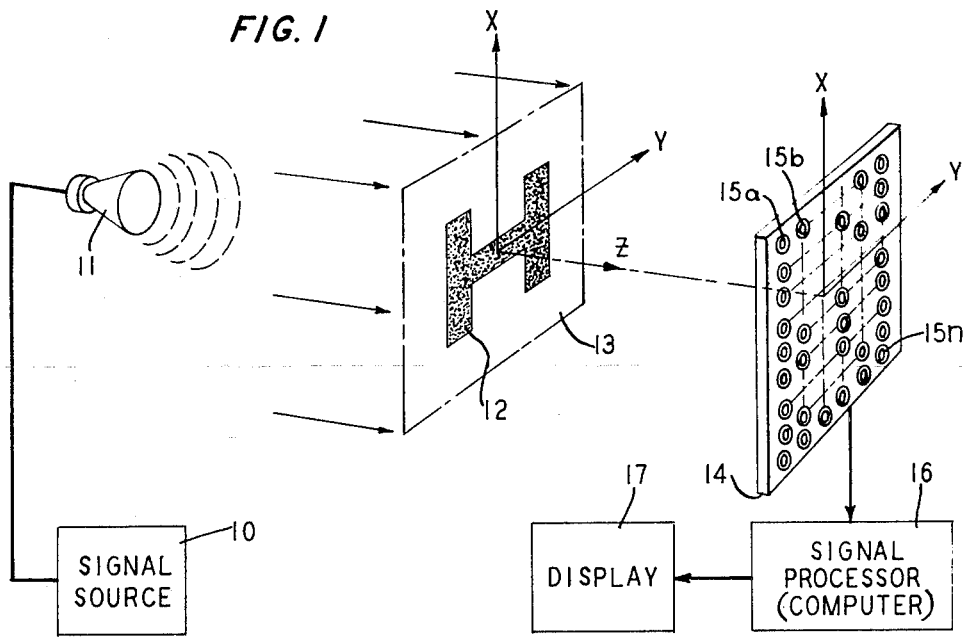
FIG. 1 is a simplified schematic illustration of a sound camera constructed in accordance with the principles of the invention.

FIG. 1 illustrates an arrangement equipped to carry out the steps required for reconstructing the shape of an object. Sound frequency signals from source 10 are delivered to a sound radiator, such as loud speaker 11, to produce a plane sound wave of wavelength $\lambda$ directed to impinge on a plane object 12 situated in a plane 13. In this example, object 12 comprises a solid plane figure in the shape of the letter "$H$." For convenience, plane 13 is said to be located at position $z=0$. Transmission through the object plane produces amplitude and phase changes in sound pressure so that in the plane $z=0$, the wavefront has a complex pressure amplitude $t(x,y)$, and travels to the right in the spatial configuration depicted in the figure. Discrete samples of the complex amplitude $r(x,y)$ are measured in a receiving plane 14 at some distance $z=s$ from object plane 13.

It is to be noted that the configuration shown in FIG. 1 is presented for illustrative purposes only. Since the complex wavefront is to be reconstructed at some plane $z=0+$, the incident wave need not be plane so long as its amplitude and phase are known at $z=0$, or at $z=s$, in the absence of an object. Furthermore, the object may be three-dimensional and $z=0+$ may be a plane immediately to the right of the object as viewed in FIG. 1. The considerations that follow, with obvious modifications, apply also to waves reflected from an object in plane 13.

The traveling wavefront is measured at a receiving plane 14 at location $z=s$. It is sampled, for example, with a sound-sensitive transducer such as a microphone, at discrete points $p,q$ in a rectangular matrix at points $15_a, 15_b, \ldots, 15_n$. For real time sampling, a plurality of individual microphones are positioned at each sampling point in the matrix. Alternatively, a single microphone may be employed and moved successively to each of the points in the matrix, recording the sampled values of amplitude and phase obtained at each location for subsequent processing. In any event, the sampled signaled values derived from the matrix positions in plane 14 are delivered to signal processing apparatus 16.

Processor 16 is arranged to evaluate the complex signal data from the sample locations in plane 14 and to develop a signal which may be used to control a visual reconstruction of the shape of object 12 in plane 13.

The resulting reconstruction data is thereupon delivered to a utilization system, for example, display apparatus 17, to produce a visual portrayal of the image of object 12. The wavefront data from processor 16 may be displayed in a variety of ways, for example, on a facsimile receiver, a cathode ray display, or the like. Normally, the intensity of the reconstructed wavefront is displayed. If desired, however, the wavefront may be displayed in its component parts, for example, the real and imaginary parts of the complex image may be separately displayed.

Although signal processor 16 may comprise an assemblage of individual operational elements arranged to evaluate the relations set forth below, it preferably comprises a computer programmed in accordance with these relationships.

Signal Analysis

The relationship between a complex wave $r(x,y)$ in the receiving plane ($z=s$) and the complex pressure amplitude $t(x,y)$ of the wave in the object plane ($z=0$) is derived by plane-wave superposition as follows. For $z > 0$, the pressure $p(x,y,z)$ $$\nabla^2 p + k^2 p = 0, \quad (1)$$

where $k=2\pi/\lambda$ is the wave number. A plane wave, $\exp[j(\omega x + \sigma y + \mu z)]$ satisfies Equation (1) provided that $\omega^2 + \sigma^2 + \mu^2 = k^2$, where $\omega$, $\sigma$ and $\mu$ represent, respectively, the spatial frequencies in the $x,y,z$ directions.

The general solution is developed by superposing a number of such plane waves.

$$p(x, y, z) = \int_{-\infty}^{\infty}\int f(\omega, \sigma) \exp$$
$$[j(\omega x + \sigma y + z\sqrt{k^2 - \omega^2 - \sigma^2})]\, d\omega d\sigma \quad (2)$$

is the general solution with the function $f(\omega,\sigma)$ arbitrarily selected. To match the solution to the boundary at $z=0$, $f(\omega,\sigma)$ is selected to be equal to $T(\omega,\sigma)$, where $$T(\omega, \sigma) = \int_{-\infty}^{\infty}\int t(x, y) \exp[-j(\omega x + \sigma y)]\, dx dy. \quad (3)$$

Thus, $$r(x, y) = \int_{-\infty}^{\infty}\int T(\omega, \sigma) \exp$$
$$[j(\omega x + \sigma y + s\sqrt{k^2 - \omega^2 - \sigma^2})]\, d\omega d\sigma. \quad (4)$$

The quantity $\sqrt{k^2 - \omega^2 - \sigma^2}$ in the exponent of Equation (4) becomes imaginary for $\omega^2 + \sigma^2 > k^2$, so that for such values of $\omega$ and $\sigma$ the plane wave components are strongly attenuated for $s$ greater than a few wave lengths. As an example, if $s = 5\lambda$, then for $\sqrt{\omega^2 + \sigma^2} = 1.01\, k$ the attenuation is more than 40 db. For all practical purposes, $$r(x, y) = \int_{-\infty}^{\infty}\int T_B(\omega, \sigma) \exp$$
$$[j(\omega x + \sigma y + s\sqrt{k^2 - \omega^2 - \sigma^2})]\, d\omega d\sigma \quad (5)$$

where $$T_B(\omega, \sigma) = T(\omega, \sigma); \quad \omega^2 + \sigma^2 < k^2 \quad (6)$$
$$= 0 \quad \omega^2 + \sigma^2 > k^2.$$

Equation (5) is a Fourier integral which can be inverted to give $$T_B(\omega, \sigma) = R(\omega, \sigma) \exp[-js\sqrt{k^2 - \omega^2 - \sigma^2}],$$
$$\omega^2 + \sigma^2 < k^2 \quad (7)$$

or $$t_B(x, y) = r(x, y) * g(x, y). \quad (8)$$

In Equation (8), $t_B(x, y)$ is a band-limited version of $t(x, y)$ (limited to the circle $\omega^2 + \sigma^2 < k^2$ in the spatial frequency space of $\omega$ and $\sigma$), the function $g(x, y)$ is given by $$g(x, y) = \int\int_{\omega^2+\sigma^2<k^2}$$
$$\exp[-j(s\sqrt{k^2 - \omega^2 - \sigma^2} + \omega x + \sigma y)]\, d\omega d\sigma \quad (9)$$

and the symbol * denotes convolution. Thus, a band-limited version of $t(x,y)$ is reconstructed if $r(x,y)$ is known.

The band-limiting of the reconstructed wavefront $t_B$, is of course inherent in all imaging systems, including holography. Under certain conditions, however, some amount of "un-bandlimiting" can be achieved by numerical processing. Such processing may, if desired, be carried out in the practice of this invention. It is possible because the reconstructed waveform is numerically available as a complex function.

Figure 3:
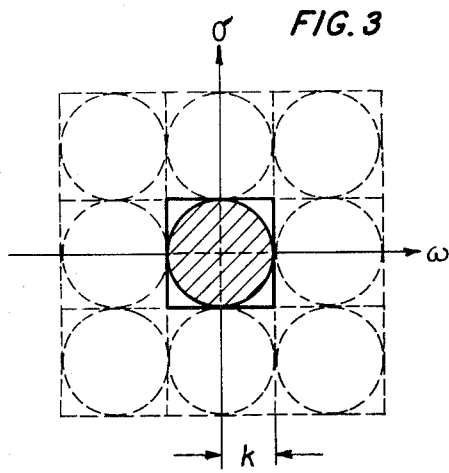
FIG. 3 illustrates the spatial frequency plane $(\omega,\sigma)$ indicating the region (0) to which the functions $r(x,y)$, $g(x,y)$ and $t_B(x,y)$ are limited. In this representation, the sampling rate is chosen to be adequate for all functions limited to the solid square. The dotted squares and circles indicate aliased frequency regions.

FIG. 3 illustrates the spatial frequency plane ($\omega,\sigma$) and the effect of two-dimensional sampling of bandlimited functions. The functions $t_B$, $r$, and $g$ of Equation (8) are all band limited, (they are restricted in the frequency domain to the shaded circle area of FIG. 3). Analogous to the case of band-limited functions of time, two-dimensional band-limited functions can be uniquely reconstructed from appropriately spaced samples. If efficient, i.e., Nyquist rate, sampling is desired, the sampling arrangement as well as the interpolating functions become very complicated even for band limitation to a sample region such as a circle. However, if the region is square, then the two-dimensional sampling theorem becomes a direct extension of the well-known sampling theorem for low-pass signals. Accordingly, it is in accordance with the invention to treat the functions of Equation (8) as though they were limited to the circumscribing square in FIG. 3. This yields an enormous simplification at the expense of requiring a sampling rate which is only about 12 percent higher than the theoretical minimum.

With such simplification, it has been found that samples on a square lattice (of spacing $\lambda/2$) suffice to reconstruct the functions $t_B$, r and g. Thus, Equation (8) can be written in terms of discrete samples of $r(x,y)$ as follows $$t_B(x, y) = \sum_{m,n=-\infty}^{\infty} t_{mn}$$
$$\frac{\sin k\left(x - \frac{m\lambda}{2}\right)}{x - \frac{m\lambda}{2}} \cdot \frac{\sin k\left(y - \frac{n\lambda}{2}\right)}{y - \frac{n\lambda}{2}}, \quad (10)$$

where $$t_{mn} = \sum_{p,q=-\infty}^{\infty} r(p\lambda/2, q\lambda/2)\, g((m-p)\lambda/2, (n-q)\lambda/2). \quad (11)$$

Equations (10) and (11) are the required results; they are evaluated for the sampled matrix values in processor 16.

Signal Processing

Processor 16 preferably comprises a digital computer programmed to evaluate sampled data by the solution of Equations (10) and (11). Although any number of satisfactory programs will occur to those skilled in the art for solving equations for data received from each microphone location, one suitable program format is outlined below.

The complex pressure amplitude $r(x,y)$ of the wave at receiving plane 14 (FIG. 1) is measured by a transducer at each location within the plane in a matrix p,q, where the sampling points are spaced one from the other by $\lambda/2$ in both the $p$ and $q$ coordinate directions. Thus, there is supplied as an input to processor 16 an array of complex pressure amplitude values $r(p\lambda/2), q(\lambda/2))$ to complete the parenthetical expression. In complex notation, the array of values becomes $A_{p,q} e^{-j\phi_{p,q}}$, where $A_{p,q}$ and $\phi_{p,q}$ are the amplitude and phase, respectively, of the (p,q)th transducer (15) signal relative to a standard reference. Although any reference level may be used for evaluation, one particularly suitable one is the signal delivered by source 10 to loud speaker 11. If desired, the signal may be supplied as a reference signal to processor 16 (by a connection not shown).

It is next convenient to express $g(x,y)$, the complex function of $x,y$ defined in Equation (9), as:

$$g(x,y) = Re(x,y) + jI(x,y). \quad (12)$$

The integrand in Equation (9) is highly oscillatory, yet $g$ may be expressed in a form convenient for computation. Since both the real and imaginary parts of $g(x,y)$ are circularly symmetric around the origin, both can be expressed in terms of the dimensionless quantities $\alpha = k\sqrt{x^2+y^2}$ and $\beta = ks$. With a complete mathematical transformation, the Real $(R)$ and Imaginary $(I)$ parts of $g(x,y)$ may be expressed as:

$$R = 1/2 K(\alpha, \beta) - \frac{z}{\pi 2} \sum_0^\infty [K(\alpha, \beta + (2n+1)\pi) + K(\alpha, \beta - (2n+1)\pi)](2n+1)^2, \quad (13)$$

where $$K(\alpha, \beta) = \sin\sqrt{\alpha^2+\beta^2}/\sqrt{\alpha^2+\beta^2}$$

and, $$I = \beta(\cos\sqrt{\alpha^2+\beta^2} - \sin\sqrt{\alpha^2+\beta^2})/(\alpha^2+\beta^2). \quad (14)$$

Figure 2:
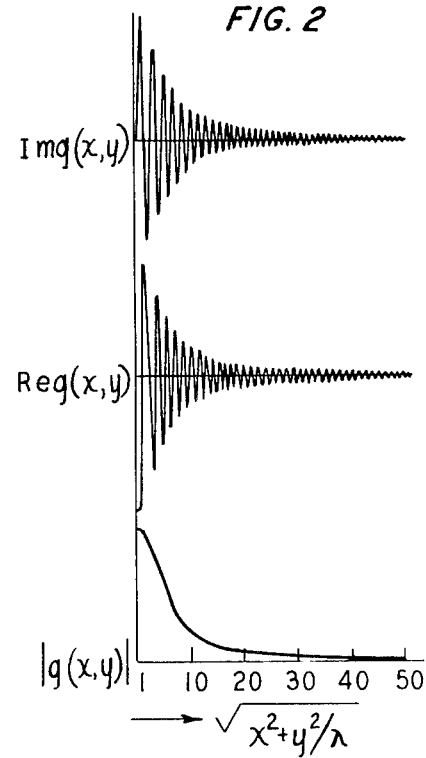
FIG. 2 illustrates in graphic form the real part, imaginary part, and magnitude of an interpolating function $g(x,y)$, for $s=5\lambda$.

FIG. 2 shows, for example, the real part, the imaginary part, and the magnitude of $g(x,y)$ for $s=5\lambda$.

The measured values of signal pressure are then individually multiplied by $g(x,y)$ for all values of $x=(m-p)\lambda/2$ and $y=(n-q)\lambda/2$, where $m$ and $n$ are the integers of Equation (10) and are selected over a sufficient range to yield accurate results. In practice, it has been found that the series computations (values of $m,n$) can be truncated to terminate with form eight to 10 values each of $m$ and $n$.

The products of $r(p(\lambda/2), q(\lambda/2))$ and $g((m-p)\lambda/2, (n-q)\lambda/2)$ for fixed values of $m$ and $n$ are evaluated for all values of $p,q$ to obtain the summations $t_{m,n}$ which are the complex numbers of Equation (11).

In analogous fashion, values of $\sin k(x-m(\lambda/2))$ and $\sin k(y-na(\lambda/2))$ are evaluated and divided by the enclosed factor to obtain a $\sin x/x$ form of function as set forth in Equation (10). The two sets of values are multiplied together and by values of $t_{m,n}$ (from Equation (11)) and the resultant products for selected values of $m,n$ are summed to yield values of the band-limited wavefront $t_B$ at plane 14.

The values of $t_b(x,y)$ from Equation (10) B delivered to display apparatus 17 for creating a visual display. As desired, the real and imaginary parts of the values of $t_B$ may be displayed separately or in a variety of combinations.

The reconstruction formulas developed above require the summation of infinite series (as do all stable reconstructions of continuous signals from sample values). In view of the rather long tails of the (complex) interpolating functions (FIG. 2), it is difficult to visualize the effect of truncating the series in Equation (13). To determine the accuracy of reconstruction with a finite series, it is convenient to simulate the reconstruction process on a computer.

Figure 4:
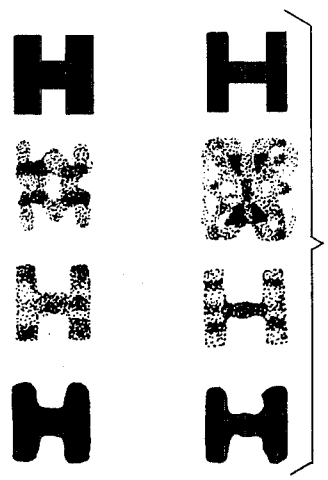
FIG. 4 illustrates the original, and various reconstructions by computer operations of a simulated object (left-hand column), and a real object with actual laboratory measurements (right-hand column).

In a typical simulation of practice, $r(x,y)$ for some given $t(x,y)$ is computed according to Equation (4) and the reconstruction is obtained from Equations (12) and (13) with $r_{pq} = 0$ for $|p|, |q|$, greater than some specified number $M$. The computer is programmed to record the intensity of the wavefront on to digital tape. A visual display is obtained from this tape, for example, by a facsimile receiver. The left hand column of FIG. 4 shows the results of one such simulation. The original object chosen is the letter H with overall dimensions $6\lambda \times 6\lambda$ (top figure). The second figure is a display of $|r(x,y)|^2$ with the distance $s$ between the object plane and receiving plane equal to $5\lambda$. This figure represents the shadow of the object in the receiving plane. The third figure displays the reconstruction of $|t_B(x,y)|^2$ from Equations (12) and (13) with the series truncated so that $-8 \le p,q \le 8$ (i.e. a total of $17^2 = 289$ samples of $r(x,y)$). Finally, the bottom figure is obtained by quantizing $|t_B(x,y)|^2$ to two levels, with the decision level set at half the maximum value of $|t_B(x,y)|$.

Turning the principles discussed above to account for the reconstruction of the shape of a real object, the steps of the method of this invention have been carried out with an arrangement of the sort illustrated in FIG. 1. With this arrangement, it has been possible to obtain excellent reconstruction of an image via acoustic means. In a typical example of practice, a letter H, approximately 1 ft × 1 ft, cut out of a ¼ inch plastic sheet, was used as the object and placed in plane 13, i.e., at $z=0$. A sound source comprising a driver unit with a ½ inch opening placed about 7.5 feet from the object was used to irradiate the object with a sound wave at a frequency of about 6.7 kHz (wavelength in air $\approx 2$ inches). A pickup transducer comprising a ½ inch condenser microphone was placed at the receiving plane 14, i.e., at $z=s$ where $s$ was equal to $5\lambda$. Both the phase and amplitude of the sound wave were measured at 81 points in plane 14. These points correspond to $0 \le p, q \le 8$ in Equation (13). Because of the four-fold symmetry of the letter H, these 81 measurements are equivalent to the case $M = 8$ discussed above for the computer simulation. The right hand column of FIG. 4 displays typical results. The four figures correspond, respectively, to the pictures in the left hand column for the simulation.

As noted above, a two-dimensional object was chosen here for illustrative purposes only. For such an object, $t(x,y)$ can be interpreted rather simply as the complex transmission coefficient of the object as a function of position. In the case of a three-dimensional object located in the region $z \le 0$, $t(z,y)$ represents the total change in the wavefront upon traversing the object. This information is insufficient to obtain a three-dimensional function which uniquely maps any acoustical property (analogous to transmission coefficient) of the object. Nevertheless, if the formulas developed above are used to reconstruct the wavefront in some plane $z < 0$ through the object, a wavefront is obtained which, had it travelled through free space, would have produced the measured wavefront in the receiving plane. This is identical to taking a section through the "real" image in a holographic reconstruction. Therefore, to the extent that the real image "looks" like the object, the "shape" of a three-dimensional object can be reconstructed as it appears to an acoustic wave. Of course, additional information about a three-dimensional object may be obtained by photographing the object, in accordance with the principles of the invention, from various directions.

It is important to note that the lattice spacing in the receiving plane can be made larger than $\lambda/2$ if $T(\omega,\sigma)$ is effectively contained within a region smaller than the circle of radius $k$. Thus if $T(\omega,\sigma) = 0$ for $\omega^2+\sigma^2>(4\pi^2/\alpha^2)$, with $\alpha > \lambda$, then the lattice spacing may be made as large as $\alpha/2$. The interpolation function $g(x,y)$ must then be rederived.

What is claimed is:

1. The method of creating a graphic reconstruction of the shape of an object from the pattern of an acoustical wave dispersed by said object which comprises the steps of:
    irradiating an object with sound waves,
    sampling both the amplitude and phase of sound pressure changes in the resulting complex wavefront at each of a selected number of discrete point in a plane within the acoustic field surrounding said object,
    employing said samples of amplitude and phase of said pressure changes obtained at each of said points to develop signals which represent a visual reconstruction of the shape of said object, and
    utilizing said signals to control the generation of a visual replica of said object.

2. The method of producing a visual replica of the shape of an object from measurements of the diffraction pattern produced when an object is placed in the path of a monochromatic sound wave, which comprises the steps of:
    irradiating an object with a monochromatic sound wave,
    measuring both the amplitude and phase of said sound wave at a discrete set of points in the acoustic field surrounding said object,
    employing said measurements of amplitude and phase to evaluate the complex diffraction pattern of said wave in said field, and
    utilizing said evaluation to control the generation of a visual replica of said object.

3. The method of visualizing an object from the pattern of a sound wave dispersed by said object which comprises the steps of:
   irradiating an object situated in a plane $z=0$ with a monochromatic sound wave of wavelength $\lambda$;
   measuring the complex amplitude $r(x,y)$ of said sound wave at a selected number of discrete points in a rectangular matrix of spacing $\lambda/2$ in a plane $z=s$ spaced apart from said object plane by distance $s$;
   converting discrete values of the complex amplitude $r(x,y)$ into continuous functions $r(x,y)$;
   employing said continuous functions to evaluate a band-limited version $t_B(x,y)$ of the sound wavefront in the object plane $z=0$ according to the relation
   $$t_B(x, y) = r(x, y) * g(x, y),$$
   where
   $$g(x, y) = \iint_{\omega^2+\sigma^2<k^2} \exp[-j(s\overline{k^2-\omega^2-\sigma^2} + \omega x + \sigma y)]d\omega d\sigma$$
   in which $k$ represents the wave number of said irradiating sound wave, * denotes convolution, and $\omega$ and $\sigma$ represent spatial frequencies in the $x$ and $y$ directions, respectively, in said plane $z=s$; and
   utilizing said evaluation of $t_B(x,y)$ to control the generation of a replica of said object.

4. The method of visualizing an object from the pattern of a sound wave dispersed by said object which comprises the steps of:
   irradiating an object situated in a plane $z=0$ with a monochromatic sound wave of wavelength $\lambda$;
   measuring the complex amplitude $r(x,y)$ of said sound wave at a selected number of discrete points with coordinates $(p\lambda/2, q\lambda/2)$, where $p$ and $q$ are integers in a plane $z=s$ spaced apart from said object plane by a distance $s$;
   developing complex functions of $x,y$ as $g(x,y) = Re(x,y) + jI(x,ya\delta)$;
   evaluating a function $t_{m,n}$ for selected integer values of $m$ and $n$ as
   $$t_{mn} = \sum_{p,q=-\infty}^{\infty} r(p\lambda/2, q\lambda/2)g((m-p)\lambda/2, (n-q)\lambda/2);$$
   determining the values of a band-limited version of the sound wavefront in the object plane $z=0$ according to the relation
   $$t_B(x,y) = \sum_{m,n=-\infty}^{\infty} t_{mn} \frac{\sin k\left(x-\frac{m\lambda}{2}\right)}{x-\frac{m\lambda}{2}} \cdot \frac{\sin k\left(y-\frac{n\lambda}{2}\right)}{y-\frac{n\lambda}{2}};$$
   and
   utilizing values of $t_B(x,y)$ for creating a visual display of said object.

* * * * *